United States Patent
Bryson et al.

[15] 3,644,088
[45] Feb. 22, 1972

[54] PREPARATION OF TRANSITION METAL OXYHALIDES

[72] Inventors: Jay G. Bryson, Tallmadge; Henry R. Menapace, Stow; Gereld S. Benner, Tallmadge, all of Ohio

[73] Assignee: The Goodyear Tire & Rubber Company, Akron, Ohio

[22] Filed: Sept. 14, 1970

[21] Appl. No.: 72,182

[52] U.S. Cl..................................23/15 W, 23/19 V, 23/21, 23/85
[51] Int. Cl. .......................................C22b 59/00
[58] Field of Search........................23/15 W, 19 V, 16, 21, 85

[56] References Cited

UNITED STATES PATENTS 3,057,679   10/1962   Culbertson et al......................23/21 X

OTHER PUBLICATIONS

Crouch et al., " Journal of the Chemical Society," (A) 1969, pp. 2412–2415.

Primary Examiner—Herbert T. Carter
Attorney—F. W. Brunner and J. Y. Clowney

[57] ABSTRACT

There is disclosed a method of preparing tungsten oxychloride, tungsten oxybromide, vanadium oxychloride and vanadium oxybromide which comprises passing at least one transition metal halide from the group of tungsten hexachlroide, tungsten hexabromide, vanadium pentachloride and vanadium pentabromide, while in vapor form, over a catalyst comprising at least one oxide selected from the group of alumina, magnesia, silica, boria, calcium oxide, chromia, manganese dioxide, cobaltic oxide, nickel oxide, phosphorous pentaoxide, zinc oxide and mixtures thereof, at temperatures ranging from about 200° C. to about 300° C.

6 Claims, No Drawings

PREPARATION OF TRANSITION METAL OXYHALIDES

This invention is directed to a new process of preparing certain transition metal oxyhalides from certain transition metal halides.

The manufacture of certain transition metal oxyhalides from certain transition metal halides is known. For instance, tungsten oxychloride ($WOCl_4$) can be prepared by passing tungsten hexachloride ($WCl_6$) over glowing silica at temperatures ranging up to about 2,000° C. Likewise, tungsten oxybromide ($WOBr_4$) may be prepared from tungsten hexabromide ($WBr_6$) in a like manner. Vanadium oxychloride ($VOCl_3$) or vanadium oxybromide ($VOBr_3$) can be prepared from vanadium pentachloride ($VCl_5$) or vanadium pentabromide ($VBr_5$) by passing the $VCl_5$ or the $VBr_5$ over glowing silica at temperatures ranging up to about 2,000° C. Other methods are also known, for instance, $WOCl_4$, $WOBr_4$, $VOCl_3$ or $VOBr_3$ can be prepared from $WCl_6$, $WBr_6$, $VCl_5$ or $VBr_5$ by passing the tungsten or vanadium halides over tungsten oxide ($WO_3$).

However, these known methods present some problems. For instance, the first method just discussed requires temperatures ranging up to 2,000° C. with all the attendant problems of such high temperature operations. Passing of $WCl_6$, $WBr_6$, $VCl_5$ or $VBr_5$ over $WO_3$ results in rather poor yields of the oxyhalides being produced.

Therefore, it is an object of this invention to provide an improved process for the production of tungsten oxychloride, tungsten oxybromide, vanadium oxychloride or vanadium oxybromide from tungsten hexachloride, tungsten hexabromide, vanadium pentachloride or vanadium pentabromide, without the disadvantages of prior known methods.

According to the invention, it has been discovered that tungsten oxychloride ($WOCl_4$), tungsten oxybromide ($WOBr_4$), vanadium oxychloride ($VOCl_3$) or vanadium oxybromide ($VOBr_3$) can be prepared by a process which comprises passing at least one transition metal halide from the group of tungsten hexachloride, tungsten hexabromide, vanadium pentachloride and vanadium pentabromide, while in vapor form, over at least one oxide selected from the group of alumina, magnesia, silica, boria, calcium oxide, chromia, manganese dioxide, cobaltic oxide, nickel oxide, phosphorous pentaoxide, zinc oxide and mixtures thereof, at temperatures ranging from about 200° C. to about 300° C.

The operating conditions which may be employed in the process of this invention are temperatures ranging from about 200° C. to about 300° C. and pressures ranging from about 1 to about 760 torr. The environment of the process must be free from moisture and oxygen. Therefore, the process of this invention should be protected from water, water vapor or oxygen by the use of a dry, oxygen-free, inert atmosphere, for instance, nitrogen, argon, neon and other dry, inert oxygen-free gases.

The tungsten oxychloride, tungsten oxybromide, vanadium oxychloride and vanadium oxybromide prepared in accordance with this invention find utility as catalysts in various other chemical processes; for instance, the polymerization of olefins.

The invention is further exemplified by reference to the following examples which are designated to be illustrative rather than restrictive of the scope of this invention.

EXAMPLE I

In a suitable apparatus 10.04 grams of gamma alumina of a size of 8 to 16 mesh were dried overnight at 490° C. under a vacuum of 1 torr pressure. The apparatus containing the gamma alumina was fitted to another apparatus containing 3.99 grams of tungsten hexachloride ($WCl_6$) and the whole of the apparatus fitted with a condenser. The system was then flushed with nitrogen and the pressure reduced to 2.5 torr and heated to 280° C. to sublime the $WCl_6$ and the sublimed $WCl_6$ was allowed to pass over the alumina in vapor form. The effluent was condensed by cooling in the condenser and collected. The sublimation of the $WCl_6$ was continued for 10 minutes and the system was vented with additional nitrogen and allowed to cool. There was obtained a 97 percent conversion of $WCl_6$ and an 86 percent selectivity to $WOCl_4$.

EXAMPLE II

In a suitable apparatus there was placed 19.28 grams of silica in the form of ⅛ inch pellets. This apparatus containing the silica was fitted to another apparatus containing 4.92 grams of tungsten hexachloride ($WCl_6$) and was fitted with a condenser in the manner of Example I. The system was flushed with nitrogen and the pressure reduced to 2.5 torr and heated to approximately 290° C. to sublime the $WCl_6$ and the sublimed $WCl_6$ was passed over the silica. The effluent was condensed by cooling in the condenser and collected. The sublimation of the $WCl_6$ was continued for 10 minutes and the system was vented with additional nitrogen and allowed to cool. There was obtained a conversion of 97 percent of the $WCl_6$ and 4.1 grams of $WOCl_4$ were collected, indicating a selectivity to $WOCl_4$ of 99 percent.

EXAMPLE III

In an apparatus similar to that of Examples I and II was placed 19.6 grams of magnesia having a mesh size of 8–16. This magnesia was dried for 16 hours at 440° C. and 0.3 torr pressure. The apparatus containing the magnesia was fitted to an apparatus containing 2.96 grams of $WCl_6$ and fitted with a condenser. The system was treated with nitrogen and the pressure reduced to 1 torr and then heated to about 230° C. to sublime the $WCl_6$. The time required to sublime the $WCl_6$ was 20 minutes. The $WCl_6$ vapor was passed over the magnesia and the effluent collected by cooling. There was obtained 1.87 gram of $WOCl_4$ indicating a conversion of 98 percent of the $WCl_6$ and a selectivity to $WOCl_4$ of 75 percent.

While certain representative embodiments and details have been shown for the purpose of illustrating the invention, it will be apparent to those skilled in this art that various changes and modification may be made therein without departing from the spirit or scope of the invention.

What is claimed is:

1. A method of preparing tungsten oxychloride ($WOCl_4$), tungsten oxybromide ($WOBr_4$), vanadium oxychloride ($VOCl_3$) and vanadium oxybromide ($VOBr_3$) which comprises passing a transition metal halide from the group of tungsten hexachloride, tungsten hexabromide, vanadium pentachloride and vanadium pentabromide, while in vapor form, over at least one oxide selected from the group of alumina, magnesia, silica, boria, calcium oxide, chromia, manganese dioxide, cobaltic oxide, nickel oxide, phosphorous pentaoxide, zinc oxide and mixtures thereof, at temperatures ranging from about 200° C. to about 300° C., and pressures ranging from about 1 to about 760 torr., and under moisture-free and oxygen-free conditions.

2. A method according to claim 1 in which the catalyst is magnesia.

3. A method according to claim 1 in which the catalyst is alumina.

4. A method according to claim 1 in which the catalyst is silica.

5. A method according to claim 1 in which the transition metal halide is tungsten hexachloride.

6. A method according to claim 1 in which the transition metal halide is vanadium pentachloride.

* * * * *